Feb. 6, 1934.   R. J. NORTON   1,946,100
ELECTRICAL DYNAMOMETER
Filed March 5, 1929
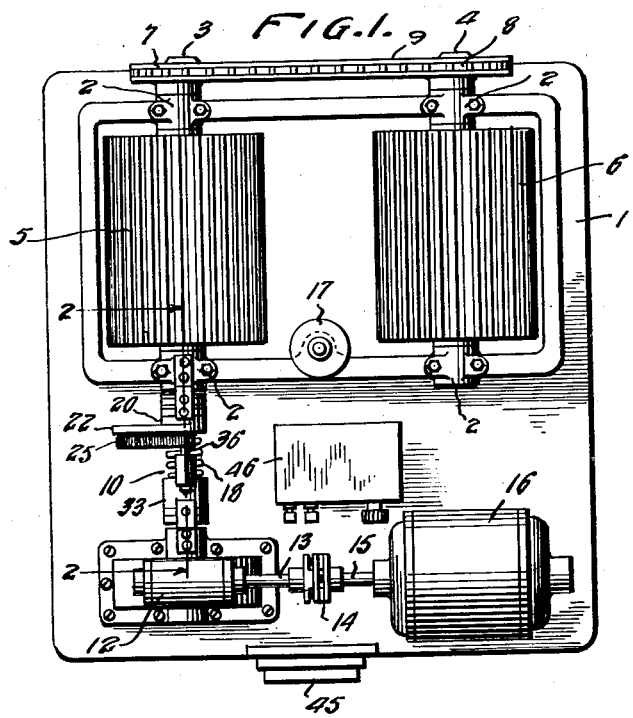
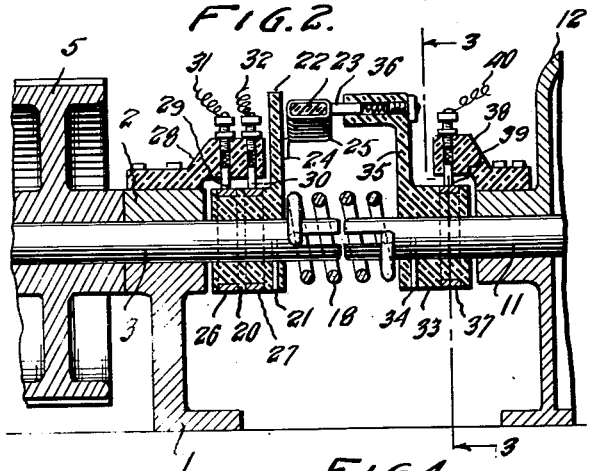
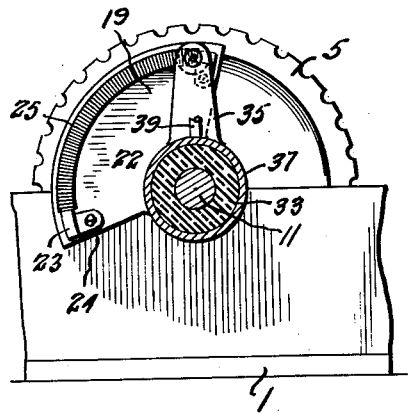
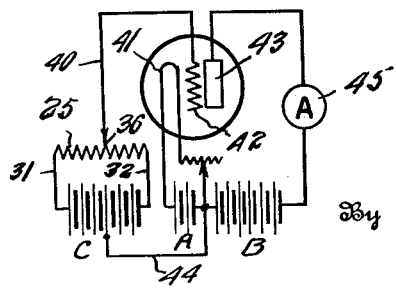
Inventor
RAYMOND J. NORTON
By Semmes & Semmes
Attorneys Patented Feb. 6, 1934

1,946,100

UNITED STATES PATENT OFFICE 1,946,100

ELECTRICAL DYNAMOMETER

Raymond J. Norton, Washington, D. C., assignor, by mesne assignments, to Bendix-Cowdrey Brake Tester, Inc., New York, N. Y., a corporation of Delaware Application March 5, 1929. Serial No. 344,574

2 Claims. (Cl. 265—25)

This invention relates in general to brake testing apparatus and more particularly has reference to apparatus for electrically determining the efficiency of brake mechanisms.

This device generally includes a transmission dynamometer interposed between the source of power and the braking mechanism which serves to measure the reaction force or the torque imposed on the testing assemblage by the application of the brake of a given wheel.

The purpose of the present invention is to increase the efficiency of testing structures by minimizing the frictional losses, and to effect installing and operating economy by simplifying the physical structure, and consequently increasing the sensitivity of the structure as a whole. To accomplish this result, it has been necessary to depart entirely from the heretofore methods of testing, which utilized a mechanical apparatus for receiving, transmitting and recording the braking torque created by the application of the brakes on the vehicle being tested. Because of the above pointed out and other inherent disadvantages in testers of the mechanical type, there is a pressing need for an accurate, sensitive, simple and reliable means for measuring brake resistance. The present invention, therefore, resides in the method and means of testing the brakes on automotive vehicles, which will eliminate the use of the hereinbefore described complicated mechanical devices. This invention is carried into effect by providing for electrically measuring the efficiency of vehicle brakes.

An object of this invention, therefore, is to provide a simple but accurate and sensitive method for determining the retarding force exerted by the braking mechanism of automotive vehicles.

Yet another object of this invention is to provide a means for determining the efficiency of vehicle brakes by transmitting a mechanical braking effect into a variation in the potential applied to the grid of a thermionic tube and indicating the variations by variations in the current in the plate circuit of the tube.

A still further object of this invention is to devise an apparatus for electrically testing brakes of automotive vehicles in which a potentiometer for varying the potential applied to the grid of an electron tube is operated by a means operable upon variation in torque created by the retardation effect of the application of the vehicle brake mechanism.

With these and other objects in view, which may be incident to my improvements, the invention consists in the concept of utilizing a mechanical effect of brake application to control electrical energy such as the quantity of electrical current flowing through a circuit, and then measuring the effect of the control as hereinafter set forth and claimed, with the understanding that the several necessary features of my invention may be varied without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been the subject of illustration.

In the drawing:

Figure 1 is a plan view of a brake testing machine constructed in accordance with my invention.

Figure 2 is detailed sectional view taken on line 2—2 of Fig. 1 showing the mechanism for operating the potentiometer.

Figure 3 is a sectional view taken on line 3—3 of Fig. 2.

Figure 4 is a diagrammatic illustration of an electrical circuit associated with the testing machine.

Brake mechanisms are provided on automotive vehicles primarily to decelerate the speed of the vehicle. In the present practice, brake mechanisms are provided directly on the ground wheels of the vehicle or on shafts directly connected with all or certain of the ground wheels. The immediate and direct result of the operation of the braking mechanism is a decrease in the angular velocity of the brake-controlled ground wheels.

Upon applying a light force to the brake-operating device, the deceleration will be relatively and correspondingly small; however, upon increasing the force applied to the brake-operating device, the decelerating effect of the brake mechanism will be proportionately increased. The preceding is, of course, based on the assumption that possible variables, such as the coefficient of friction between the drum and the braking element, the brake mechanism, etc., be maintained substantially constant.

The present specific embodiment of the invention comprises measuring a quantity which is a derivative of the increase in torque in a transmission shaft driving a given wheel, which itself results from the application of a given retarding force to the wheel. In particular, the present embodiment comprises the measurement of the factor which is a derivative of the speed retardation, and consequently the variation in torque, by controlling the measurable characteristics of an electric current and indicating the degree of control.

In order to simplify the description of my invention, a device susceptible of carrying the same into effect has been illustrated rather diagrammatically in the accompanying drawing. It will be appreciated, in view of the principles herein involved, that numerous diversifications and modifications in the actual structure will readily suggest themselves to those skilled in the art. As shown in the drawing, the invention may be embodied in a unit comprising a base 1, which may be mounted in any desired position at the end of a ramp, or suitably installed in a pit, or in any other location found advantageous for the purpose of testing brakes. The base 1 is provided with a plurality of bearings 2, which journal shafts 3 and 4, which in turn support corrugated rollers 5 and 6 respectively. The rollers 5 and 6 are surfaced, and are so positioned that they may be effectively used for driving a wheel of an automotive vehicle.

One end of the shaft 3 carries a sprocket wheel 7, and the corresponding end of shaft 4 carries a similar sprocket wheel 8. Passing over the sprocket wheels 7 and 8 is a suitable chain 9, which is so positioned and adjusted as to transmit rotary motion from one of the rollers to the other. The other end of shaft 3 projects beyond the bearing 2 and is connected with a device 10, portions of which vary with a variation in torque imposed thereon.

Associated with the torsion device 10 is a shaft 11 of a speed reduction device 12, which may be of any desired type or speed ratio. The driving shaft 13 of the speed reduction device 12 is connected by a flexible coupling 14 to the shaft 15 of an electric motor 16. The speed reduction device 12 and the motor 16 are preferably mounted on the base 1 together with the other elements of the brake tester.

It will be understood from the foregoing description that upon energizing the motor 16 the shaft 15 will be rotated, and rotary motion will be transmitted through the coupling 14, speed reduction device 12, torsion device 10 and shaft 3 to roller 5, and by means of the chain drive 7, 9, 8 to roller 6. The drive between rollers 5 and 6 is such that the two rollers rotate in the same direction. Thus, when a vehicle wheel is placed on the rollers, it will be rotated by the action of both rollers. To prevent the wheel running off of rollers 5 and 6 onto the driving machinery, a vertically mounted roller 17 is positioned on a shaft carried by base 1.

From the discussion hereinbefore set forth, it will be understood that the present embodiment contemplates utilizing the variation in the torque imposed on device 10 under varying load conditions imposed on the testing machine by the application of brake mechanism to retard rotation of the wheel to vary the characteristic of electrical energy in an electrical circuit. This may be practically effected by means of the structure shown in the drawing.

As is clearly shown in Figure 2, shaft 3 is resiliently connected to shaft 11 by means of a coil spring 18. One end of the spring 18 is fixed to shaft 3, and the other end is secured to shaft 11 in such a manner that rotary motion of shaft 11 will be translated to shaft 3. If a load is imposed on shaft 3, it will be displaced angularly with respect to shaft 11. As the load on shaft 3 is increased, the relative angular displacement will be increased.

This invention employs the angular displacement of shaft 3 relative to shaft 11 for operating a device for affecting the characteristics of electrical energy. One specific embodiment of electrical energy affecting device is clearly shown in the drawing in the form of a potentiometer.

A sleeve 20 formed of insulating material is fixed to shaft 3 by means of a suitable pin or screw 21. Attached to this sleeve or formed integrally therewith is a sector plate 22, also formed of insulating material. An arcuate core 23 is secured to the sector plate 22 adjacent the curved portion thereof by means of brackets 24. The core 23 has a resistance coil 25 mounted thereon. A pair of collector rings 26 and 27 are positioned on the insulating sleeve 20. One of these rings is connected with one end of the coil 25 and the other ring is connected with the other end of this coil.

As shown in Figure 2, a brush holder 28 is so positioned on bearing 2 as to support brushes 29 and 30 in contact with sleeves 26 and 27. Brush holder 28 is provided with sockets in which the brushes are slidably mounted. A portion of each socket is threaded to receive a screw for adjusting the pressure of a spring on the brush, which varies the pressure between the brush and the ring with which it coacts. Suitable leads 31 and 32 are associated with the brushes 29 and 30, by means of which the coil 25 is connected with a source of electrical energy.

A sleeve 33, formed of insulating material and somewhat similar to sleeve 20 is fixed to shaft 11 by means of a pin or screw 34. An arm 35 is attached to sleeve 33 or formed integrally therewith and is provided with a socket which carries a slidably mounted spring operated brush 36. The socket is so positioned on the arm 35 that the brush 36 contacts with the coil 25, and upon relative movement between sleeves 20 and 33 will slide on the coil 25. Sleeve 33 is provided with a collector ring 37, which is connected by a suitable conductor with brush 36. Brush holder 38, constructed somewhat similarly to brush holder 28, supports brush 39 in contact with ring 37. A lead 40 is attached to brush 39 and serves to connect the same with an electric circuit.

While I have described a particular type of brush construction, I wish it to be clear that any other type found suitable may be utilized.

It will be appreciated that any variation in the relative displacement of shafts 3 and 11 will cause a corresponding variation in the relative angular positions of brush 36 and core 25.

The potentiometer just described is employed in any electron tube circuit such as diagrammatically shown in Figure 4, to vary the potential imposed on the grid. This circuit includes an electron tube having a filament 41, a grid 42 and a plate 43. The grid is connected to lead 40 of the potentiometer and the leads 31 and 32 of the potentiometer are connected across a "C" battery such as is shown in Figure 4. A connection 44 is provided between the mid point of the "C" battery and one side of the filament 41. The plate circuit includes a current indicating device 45, which may be of any desired type suitable for indicating currents flowing in the plate circuit. A "B" battery is also included in this circuit as is customary. Filament 41 may be energized by an "A" battery and may be connected therewith by means of a variable resistance to vary the value of the current supplied thereto. Other condition varying devices may be associated with the circuit for maintaining a predetermined condition in the circuit.

The potentiometer is associated with the "C" battery in such a manner that various potentials, positive and negative, can be imposed on the grid. With conduit 44 connected with the mid point of the "C" battery and the brush 36 on the mid point of the resistance coil 25, the potential applied to the grid will be zero. If, however, the brush is moved to one side of the mid-point a positive potential will be applied to the grid, and, if moved to the other side of the grid, a negative potential will be applied to the grid. Thus, by varying the position of brush 36 on coil 25, a graduated range of potentials can be applied to the grid 42.

Upon supplying current to filament 41, a stream of electrons will flow from the filament to the plate 43. The flow of electrons will cause a current to flow in the plate circuit. If the filament temperature and "B" battery potential are maintained constant a variation in the potential applied to the grid 42 will cause a variation in the plate current.

The variation in plate current has been found to be a linear function of the grid potential within certain limits. It has also been found that a small variation in grid potential has the same effect on the plate current as does a relatively large variation in plate potential, depending on the amplification coefficient of the particular tube used. Thus any movement between the elements of the potentiometer will cause a variation in the current flowing through the plate circuit as indicated by the milli-ammeter or other type current indicating device 45.

Since the current flowing through the plate circuit is a function of the potential applied to the grid, and the potential is a function of the position of the brush 36 on the coil 25, which in turn is a function of the torque and brake load, the current indicated on the dial of instrument 45 may be used to compute the torque and brake resistance in terms of other physical quantities.

In the preferred form of the invention the milli-ammeter or other indicating device employed is somewhat modified; that is, the dial is calibrated so that the pointer directly indicates brake resistance in terms of retarding torque.

These calibrations may be made, as will be understood, by testing the torque of the testing unit when operating against given varying torques imposed and indicated by a suitable Prony brake or other dynamometer. Since the increase in current indicated by the ammeter 45 is proportionate to the increased resistance exerted by the brake being tested, the transformation and calibration may readily be made. The actual calibration of a given unit will, of course, depend on the particular hook-up employed, the resiliency of spring 18, the value of the resistance 25, the potential of the "A" and "B" batteries, and the type and characteristics of the thermionic tube employed.

The mode of operation of the tester will have been appreciated from the foregoing description. When the vehicle is in testing position, so that a wheel engages the wheel rotating rollers 5 and 6, the closing of the motor circuit will cause motor 33 to effect rotation of these rollers through the interposed transmission. Upon applying the brakes to the wheel, the driving motor will rotate the wheel against the resistance of the brake, but with an increase in the torque in the transmission, corresponding to the brake resistance. This increase in torque will cause a fluctuation in the torsion device located in the transmission.

This fluctuation in the torsion device will effect a variation in the relative position of the potentiometer part associated therewith. This variation will, as hereinbefore described, affect the potential applied to the grid of the electron tube to cause a variation in the current in the plate circuit, which is determined by means of a current indicating device. The brake retardation will be indicated directly on the indicating device up to a point where the vehicle wheel slips with respect to the wheel rotating means.

The electrical circuit unit 46 and instruments have been shown associated with the base 1 of the testing apparatus, but I wish it to be clearly understood that the electrical devices, particularly those affected by vibrations may be placed in any suitable location remote to the testing apparatus. Also those parts of the electron tube circuit affected by stray energy may be shielded in any desired manner.

I wish it to be clearly understood that in the event indications on the dial of the final indicating meter are not large enough, the final indicating energy can be amplified by any type of amplification system so as to obtain sufficient energy for effecting the dial of the instrument.

It will be appreciated that I have provided a very simple and effective apparatus of testing vehicle brakes. The apparatus involves a very simple electrical circuit, necessitating the use of electrical equipment which is standard and readily available on the market. Also employment of the several simple electrical elements involved in the testing mechanism obviates the necessity of the use of a complicated mechanical dynamometer. All of the electrical elements involved in the testing device are of a type which may be very readily checked from time to time to determine the accuracy of the testing device.

While I have shown and described a particular embodiment of the invention, it is to be understood that this is given purely by way of example. As hereinbefore pointed out, the fundamental concept involved in this invention is a utilization of a mechanical effect of brake testing, and the transformation of this effect into an electrical effect, which may be used as a means of measuring the efficiency of the brake being tested. I wish it to be understood that I do not confine myself to the precise details of construction herein set forth, by way of illustration, as it is apparent that many changes and variations may be made therein by those skilled in the art without departing from the spirit of the invention or exceeding the scope of the appended claims.

I claim:

1. A dynamometer comprising a shaft adapted to be connected with a load, a power driven shaft, resilient means for coupling the power shaft to the first mentioned shaft, an element of a variable potentiometer mounted on the first mentioned shaft, another element of the potentiometer mounted on the power shaft, an electron tube having grid and plate circuits, the grid circuit including the potentiometer, and means in the plate circuit for indicating current flowing therein.

2. A dynamometer comprising a shaft adapted to be connected with a load, a power driven shaft, resilient means for coupling the power shaft to the first mentioned shaft, an element of a variable potentiometer mounted on the first mentioned shaft, an electron tube circuit including said potentiometer, and means for measuring the variation in the current of the electron, another element of the potentiometer mounted on the power tube circuit effected by variations in the potentiometer.

RAYMOND J. NORTON.

CERTIFICATE OF CORRECTION.

Patent No. 1,946,100. February 6, 1934.

RAYMOND J. NORTON.

It is hereby certified that error appears in the printed specification of the above numbered patent requiring correction as follows: Page 3, line 144, claim 2, after "shaft," insert the words another element of the potentiometer mounted on the power shaft,; and lines 146, 147 and 148, strike out the comma and words , another element of the potentiometer mounted on the power"; and that the said Letters Patent should be read with these corrections therein that the same may conform to the record of the case in the Patent Office.

Signed and sealed this 21st day of May, A. D. 1935.

(Seal)

Leslie Frazer
Acting Commissioner of Patents.